Patented June 29, 1937

2,085,518

UNITED STATES PATENT OFFICE 2,085,518

PROCESS FOR REFINING MINERAL OIL

Willem J. D. van Dijck, The Hague, Netherlands, assignor to Shell Development Company, San Francisco, Calif., a corporation of Delaware No Drawing. Application February 18, 1935, Serial No. 7,072. In the Netherlands March 19, 1934

8 Claims. (Cl. 196—13)

My invention relates to a process for separating liquid hydrocarbon mixtures into relatively more highly and less highly paraffinic portions by extraction with selective solvents. More particularly, the present invention relates to a method of improving the extraction process by the addition of a diluent to the selective solvent.

It is known that mineral oils, such as lubricating oils, transformer oils, spindle oils, kerosene, gasoline, etc., as well as non-mineral oils can be treated with selective solvents to effect a separation between components of differing characteristics. Thus, a lubricating oil may be freed from all or a substantial part of its non-paraffinic components, such as aromatics, naphthenes and olefines, by treating it with certain selective solvents which have a preferential solubility for the non-paraffinic components under conditions producing two phases, separating the phases, and distilling them separately to recover the solvent from each of the phases. Numerous solvents and solvent mixtures have been proposed for this purpose. Among these are furfural and various solvent mixtures containing furfural in combination with a diluent.

The degree of selectivity of furfural, either alone, or in the known mixtures, is not sufficiently great to effect the high degree of separation and high yield often desirable in commercial operations. It was also found that dark-coloured constituents of hydrocarbon mixtures are not effectively removed by these solvents. Moreover, difficulty is often experienced in recovering the furfural from the separated phases because the boiling point of furfural is so high that at the temperatures of distillation decomposition of the furfural, or polymerization, or even reaction with the hydrocarbons or with the impurities carried by them is brought about. This difficulty is characterized by a loss of the solvent and by the formation of undesirable and non-readily separable dark-coloured impurities.

In accordance with my invention I overcome all of these defects to a large extent by treating the hydrocarbon oils with furfural in the presence of naphthalene. In carrying out my invention, I bring the hydrocarbon mixture into intimate contact with furfural in an extraction zone in the presence of naphthalene, which may be introduced separately, or together with the furfural or with the hydrocarbon mixture.

I may employ any suitable form of apparatus, such as a single agitating and settling zone, a series of agitators and phase separators, or a single or multistage countercurrent treater. The quantity of furfural and oil and the temperature are controlled to produce two phases, and to produce the desired yield, as is well known in the art. In countercurrent processes it is preferable to introduce all or a substantial part of the naphthalene into the process with the furfural or at a point near the point at which the raffinate or solvent-poor phase is withdrawn. This raffinate phase is poor in furfural and naphthalene, and contains mainly paraffinic constituents of the hydrocarbon mixture and may, after its withdrawal from the extraction zone, be treated to separate it into solvent and oil portions. The extract phase, which is rich in solvent, contains large amounts of non-paraffinic constituents, and is also treated to remove the furfural and naphthalene.

I may operate my extraction process in accordance with any of a large number of known methods to suit local conditions, specific properties of the treated hydrocarbons and the required purity of the end products. For example, I may employ a batch process, or a continuous or semi-continuous mode of operation. I may, moreover, use my solvent mixture in connection with an additional solvent which is caused to flow countercurrently to the furfural mixture, such a process being commonly known as the "duosol" process. I may subject the mixture to be extracted to a preliminary extraction under the same or less intense conditions. The extraction efficiency may be further improved by using temperature regulating means to provide a gradually decreasing temperature in the direction of flow of the furfural, as is well known in the art. I may also subject the extract solution obtained by treating the liquid hydrocarbon mixture with furfural and naphthalene, to the washing action of a liquid entirely or substantially consisting of the components or groups of components of the liquid mixture which are most readily dissolving in the extracting agent. Said liquid may be a part of the solution of extract in extracting agent(s) from which the extracting agent has been entirely or substantially removed and which has been obtained after the above-mentioned washing action has been applied to it.

In all these modes of extraction, the naphthalene exerts a favourable effect on the distribution of the paraffinic and non-paraffinic components between the phases produced at the operating temperature. Compared with the lighter diluents, such as benzene or ether, naphthalene has the advantage of having a higher specific gravity and therefore aids in increasing the difference in specific gravity between the raffinate and extract phases. The mixing ratio of furfural and naphthalene may be varied, and is not limited to the ratio given in the appended example. The maximum quantity of naphthalene is determined by the solubility of the naphthalene at the extraction temperature to be employed in a particular situation. By the term "effective quantity", as used in the claims, I mean such a quantity of naphthalene as will substantially improve the extraction characteristics for the particular conditions encountered, it being understood that this quantity may be determined readily by one skilled in the art.

It may sometimes be advantageous to withdraw at least a portion of the extract phase or extraction mixture at an intermediate point of the extraction zone (e. g., from an intermediate point of a countercurrent column or between two adjacent phase separating and mixing devices), remove at least a portion of the naphthalene from the withdrawn substances, and return the residual portion of the withdrawn extraction mixture to the extraction zone near the point where the substances were withdrawn. By repeating this operation at successive points of the extraction zone, the effect of a progressively decreasing concentration of the napthalene in the direction of flow of the extract phase can be obtained, which may often further improve the extraction efficiency of my process. This method of removing the diluent at successive points is more fully described and claimed in my copending application, Serial No. 11,647, filed March 18, 1935.

The napthalene and furfural may be recovered from the separated phases or from the withdrawn extraction mixture either as a mixture of solvents or separately, as desired. The recovery of the solvent may be effected by any suitable method, such as distillation or washing with a suitable solvent, such as 45% ethyl alcohol, etc.

I have found that the presence of the naphthalene makes it easier to recover the furfural by distillation, and that overheating and the consequent formation of non-readily removable impurities is minimized when an oil containing the solvent mixture of my invention is distilled.

My invention finds especial utility in the extraction of lubricating oils to produce oils having flat temperature viscosity curves (i. e. having high viscosity indices) and which are free from objectionable colouring matter. The efficiency of an extraction process of this type may be expressed in terms of the quantity and quality of the raffinate. Thus, while it is possible to produce raffinates of almost any desired viscosity index, the yield will generally be low. Therefore, for a given quality of the product, the yield is a measure of the efficiency of the extraction. Similarly, for a given yield, the efficiency of the extraction may be measured in terms of the quality (viscosity index) of the product.

By conducting the extraction in accordance with the present invention, i. e. by using furfural in the presence of naphthalene, it becomes possible to improve the quality and/or quantity of the oil raffinate and to conserve the furfural.

The marked improvement obtainable from my solvent mixture may be understood from the following example, which it is understood is exemplary only.

A Venezuelan lubricating oil distillate having a viscosity, in centistokes, of 53.6 at 210° F. and 3180 at 100° F. was extracted in four consecutive stages with an equal volume of a mixture of 70% by weight furfural and 30% of naphthalene under conditions to produce a yield of 85% by weight of raffinate at each stage. The temperatures at the successive stages were 25°, 35°, 55° and 65° C. respectively. A final solvent-free raffinate of 50% by weight of the initial oil was obtained. The viscosities of this raffinate at 210° F. and 100° F. were 31.1 and 710 respectively, which correspond to a viscosity index (Deen and Davis) of 69.

Upon extracting the same oil in four consecutive stages with an equal volume of furfural, but without the presence of naphthalene, under conditions to produce the same yield of raffinate as in the above described extraction with furfural and naphthalene, the viscosities of the produced raffinate at 210° F. and 100° F. were 32.1 and 944 respectively. These viscosities correspond to a viscosity index of 45.

These results show that the efficiency of the extraction was decidedly improved by the use of a mixture of naphthalene and furfural. Besides resulting in an improved viscosity index, my furfural naphthalene mixture removed the dark-coloured constituents of the oil more completely and more readily. Thus, in the above example, when the oil was extracted with the furfural naphthalene mixture, after the first stage of the extraction 50% of the dark-coloured constituents appeared to have been removed; but only 40% were removed after the first stage when extracting with furfural in the absence of naphthalene.

As used in the present specification and claims there is no difference between "solution" and "mixture".

I claim as my invention:

1. In an extraction process for separating liquid hydrocarbon mixtures into their component groups, the steps of extracting the mixture with furfural in the presence of an effective quantity of naphthalene to produce two liquid phases, and separating the said phases.

2. In an extraction process for separating hydrocarbon mixtures into their component groups, the steps of extracting the mixture with a mixture of furfural and naphthalene to produce two liquid phases, and separating the said phases.

3. A process for refining dark-coloured hydrocarbon mixtures to improve the colour thereof, which comprises extracting said mixture with furfural in the presence of an effective quantity of naphthalene to produce two liquid phases, and separating the said phases.

4. A process for refining petroleum lubricating oil comprising extracting the oil at least once with a selective solvent to produce a liquid raffinate containing a smaller amount of aromatics, and then further reducing the aromatic content of said raffinate by extracting said raffinate with furfural and in the presence of an effective quantity of naphthalene to produce liquid raffinate and extract phases, and separating the said phases.

5. In an extraction process for separating hydrocarbon mixtures into their components, the steps of extracting the mixture with furfural in the presence of an effective quantity of naphthalene under conditions producing a liquid raffinate and a liquid extract phase, separating the phases, and distilling at least one of said phases to recover the furfural.

6. In an extraction process for treating hydrocarbon mixtures, the steps of flowing a hydrocarbon mixture countercurrently to and in intimate contact with concurrent and commingled streams of furfural and naphthalene under conditions producing liquid raffinate and extract phases, and separating said two phases.

7. In an extraction process for separating hydrocarbon mixtures into their components, the steps of extracting the mixture with furfural in the presence of an effective quantity of naphthalene under conditions producing a liquid raffinate phase and a liquid extract phase, separating the phases, and washing at least one of said phases with a selective solvent for furfural to separate the furfural from the hydrocarbons.

8. The process according to claim 7 in which the selective solvent for furfural is aqueous ethyl alcohol.

WILLEM J. D. van DIJCK.